(12) United States Patent
McKnight et al.

(10) Patent No.: US 8,949,502 B2
(45) Date of Patent: Feb. 3, 2015

(54) PCIE NVRAM CARD BASED ON NVDIMM

(75) Inventors: Thomas P. McKnight, San Jose, CA (US); Xiaoshan Zuo, Fremont, CA (US); Umesh Maheshwari, San Jose, CA (US)

(73) Assignee: Nimble Storage, Inc., San Jose, CA (US)

( * ) Notice: Subject to any disclaimer, the term of this patent is extended or adjusted under 35 U.S.C. 154(b) by 703 days.

(21) Appl. No.: 13/300,426

(22) Filed: Nov. 18, 2011

(65) Prior Publication Data

US 2012/0131253 A1 May 24, 2012

Related U.S. Application Data

(60) Provisional application No. 61/415,296, filed on Nov. 18, 2010.

(51) Int. Cl.
G06F 13/36 (2006.01)
G06F 13/16 (2006.01)
G06F 1/30 (2006.01)
G06F 13/38 (2006.01)

(52) U.S. Cl.
CPC .............. *G06F 13/1668* (2013.01); *G06F 1/30* (2013.01); *G06F 13/385* (2013.01)
USPC ................................ 710/315; 710/22; 710/64

(58) Field of Classification Search
USPC ......... 710/22, 23, 52, 64, 301, 105, 305, 306, 710/313, 315; 711/100, 103, 104; 714/14
See application file for complete search history.

(56) References Cited

U.S. PATENT DOCUMENTS

| 6,990,603 | B2* | 1/2006 | Strasser | 714/6.2 |
|---|---|---|---|---|
| 7,350,088 | B2* | 3/2008 | Allison et al. | 713/300 |
| 7,827,346 | B2* | 11/2010 | Anderson | 711/103 |
| 2009/0172469 | A1* | 7/2009 | Xiao | 714/14 |
| 2010/0226194 | A1* | 9/2010 | Huang | 365/229 |
| 2010/0299558 | A1* | 11/2010 | Tojo et al. | 714/14 |
| 2012/0030416 | A1* | 2/2012 | Borchers et al. | 711/103 |
| 2012/0210163 | A1* | 8/2012 | Cho | 714/6.21 |
| 2013/0111104 | A1* | 5/2013 | Kim | 711/103 |

OTHER PUBLICATIONS

Hybrid Memory-Bridging the Gap Between DRAM Speed and NAND Nonvolatility, NVDIM, Micron Technology, Inc, <http://www.micron.com/products/dram-modules/nvdimm>, accessed May 31, 2013.*
DIMM, <http://en.wikipedia.org/wiki/DIMM>, accessed Jun. 3, 2013.*

* cited by examiner

*Primary Examiner* — Khanh Dang
(74) *Attorney, Agent, or Firm* — Ascenda Law Group, PC

(57) ABSTRACT

A memory system controller includes one or more sockets for accommodating NVDIMM cards produced by different NVDIMM providers; a PCIe interface for coupling the memory system controller to a host; and a controller coupled to the PCIe interface over a PCIe-compliant connection and to the one or more sockets over respective DDR2 connections. The controller is configured to manage data transfers between the host and a specified one of the NVDIMM sockets in which an NVDIMM card is accommodated as DMA reads and writes, format data received from the PCIe interface for transmission to the specified NVDIMM socket over the corresponding one or more DDR2 interfaces, and initiate save and restore operations on the NVDIMM card accommodated within the specified NVDIMM socket in response to power failure and power restoration indications.

7 Claims, 7 Drawing Sheets

US 8,949,502 B2

PCIE NVRAM CARD BASED ON NVDIMM

RELATED APPLICATIONS

This application is a NONPROVISIONAL of and claims priority to U.S. Provisional Application No. 61/415,296, filed 18 Nov. 2010, which is assigned to the assignee of the present invention and is incorporated by reference herein.

FIELD OF THE INVENTION

The present invention relates to methods and systems for interfacing non-volatile random access memory (NVRAM) storage devices to host storage systems.

BACKGROUND

It is much faster to write to NVRAM (which has write times on the order of approximately 100 microseconds) than to write to disk (which has write time on the order of approximately 10 milliseconds, i.e., 10,000 microseconds). Consequently, storage systems often employ NVRAM to expedite data writes. Thus, when a host writes data to such a storage system, the storage system writes the data into its NVRAM and sends an acknowledgement to the host that the write is complete. Later, in the background, as the NVRAM fills up, the storage system flushes the data in the NVRAM to disk.

In the usual case, an acknowledgement of the write from the storage system to the host is taken by the host as a sign that the written data is durable even though it has not been written to disk. That is, the host assumes, and the storage system is presumed to ensure, that the data in the NVRAM will be preserved even in the event of a system crash or power failure.

To provide this kind of guaranty of data durability, NVRAM devices are often implemented as a peripheral component interconnect (PCI) device containing some dynamic RAM (DRAM) with battery backup. Typically, the battery is able to preserve the data in DRAM for up to several hours or days. There are, however, problems with this approach. For example, any data saved to NVRAM but not yet saved to disk will be lost should the DRAM battery backup expire or fail before power to the storage system is reestablished. Further, the DRAM batteries are generally heavy and unreliable and sometimes need to be replaced.

SUMMARY OF THE INVENTION

Disclosed herein are methods and systems for interfacing NVRAM storage devices to host storage systems. In one embodiment of the invention, a memory system controller includes one or more sockets for accommodating NVDIMM cards produced by different NVDIMM providers; a PCIe interface for coupling the memory system controller to a host; and a controller coupled to the PCIe interface over a PCIe-compliant connection and to the one or more sockets over respective DDR2 connections. The controller is configured to manage data transfers between the host and a specified one of the NVDIMM sockets in which an NVDIMM card is accommodated as DMA reads and writes, format data received from the PCIe interface for transmission to the specified NVDIMM socket over the corresponding one or more DDR2 interfaces, and initiate save and restore operations on the NVDIMM card accommodated within the specified NVDIMM socket in response to power failure and power restoration indications. The memory system controller may also include power detection logic coupled to the PCIe interface and the controller. The power detection logic is configured to detect and provide the controller with the power failure and power restoration indications. These and further embodiments of the invention are described in greater detail below.

BRIEF DESCRIPTION OF THE DRAWINGS

The features of the present invention are illustrated by way of example, and not limitation, in the figures of the accompanying drawings, in which.

DESCRIPTION

Disclosed herein are methods and systems for interfacing NVRAM storage devices to host storage systems. In one embodiment of the present invention, an NVRAM storage unit configured to protect transient write data (e.g., data stored to NVRAM but not yet saved to disk) from power outage events by saving the data to flash memory is interfaced to a host storage system via a PCI express (PCIe)-compliant printed circuit board that includes a controller configured to manage data transfers to and from the NVRAM storage unit via direct memory access (DMA) writes and reads and to initiate data backups to flash in the event of power failures. One advantage of such an instantiation is that it accommodates NVRAM storage units of different vendors.

Figure 1:
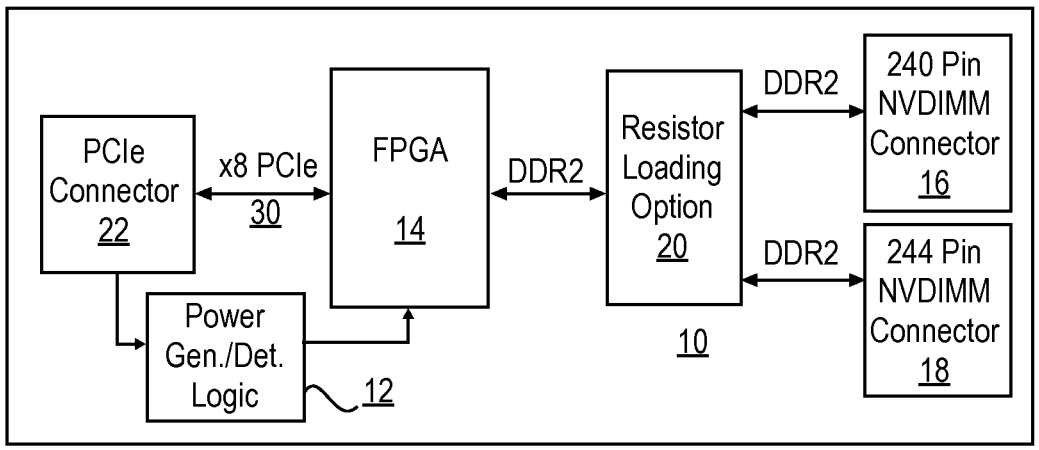
FIG. 1 provides a block diagram overview of one instantiation of an NVRAM storage device interface configured in accordance with an embodiment of the present invention.
Figure 2:
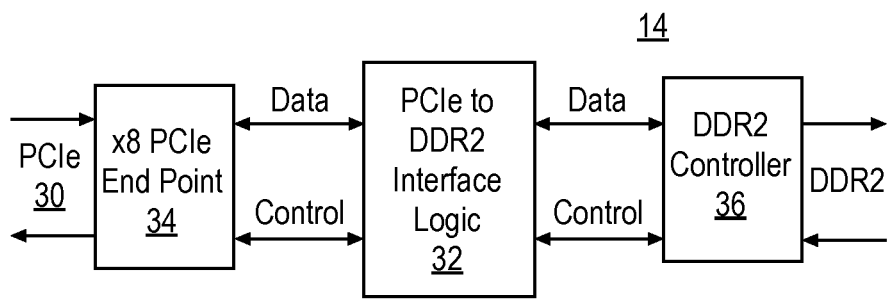
FIG. 2 illustrates details of a controller for the NVRAM storage device interface shown in FIG. 1, in accordance with an embodiment of the present invention.

FIG. 1 provides a block diagram overview of one instantiation of an NVRAM storage device interface 10 configured in accordance with the present invention. In this example, the NVRAM storage device interface 10 is a PCIe-compliant printed circuit board that includes power generation and detection logic 12, a controller, in this instance a field programmable gate array (FPGA) 14 and associated logic, configured to facilitate the data storage operations described herein, and one or more double data rate (DDR2)-based non-volatile dual in-line memory module (NVDIMM) sockets 16, 18 for accommodating NVDIMMs that include the DRAM and flash memory backup storage devices. The power generation and detection logic provides the required voltages to power the FPGA, NVDIMMs accommodated within the sockets and other miscellaneous components on the PCIe board, and to detect and provide the FPGA with advance warning of power failures. As shown in FIG. 2, the FPGA 14 is configured to facilitate high speed PCIe-based DMA to the DDR2 NVDIMM. The DMA engine of the FPGA reformats the data received over the PCIe bus 30 (which may be an 8-lane PCIe 1.1 bus that operates at 2.5 GHz or 2.5 GT/s per lane supporting up to 2 GBytes/s data transfers in each direction (read/write) for a total aggregate bandwidth maximum of 4 GBytes/s, for example) to comply with DDR2 memory interface requirements for the NVDIMM. In some instances, the card will also operate in host PCIe 2.0 slots of widths x1, x4 and x8, but will negotiate data transfer speeds compliant with PCIe 1.1 specifications.

In some instances, the present PCIe-compliant interface may be configured to support NVDIMM products from multiple different vendors. That is, sockets may be provided to support 240-pin NVDIMM cards (e.g., a 240-pin DDR2 RDIMM socket), 244-pin NVDIMM cards (e.g., a 244-pin DDR2 Mini RDIMM socket) or other card configurations. Resistor loading options 20 are provided for configuring the card according to the installed NVDIMM (in practice, each card would have only one NVDIMM card installed at a time, and the resistor loading options would be set to facilitate communication with the attached NVDIMM card). Regardless of which NVDIMM device is used, once the data has been written to the NVDIMM DRAM buffer, the data transfer is acknowledged on the PCIe bus. In the event of a power outage any data that had been written to the NVDIMM DRAM buffer is copied to the NVDIMM on-board flash memory. The copying operation is completed with power provided by an attached ultra capacitor, which is provided by the NVDIMM vendors.

Figure 3:
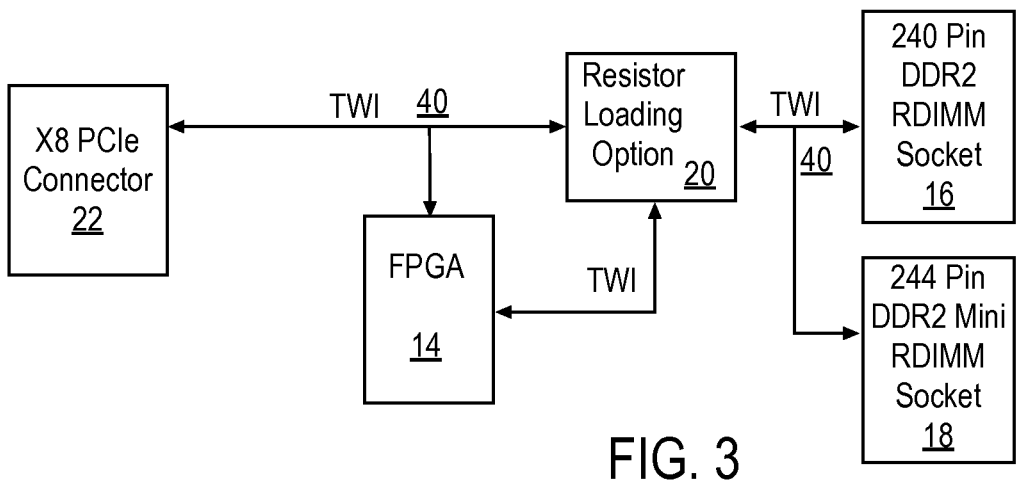
FIG. 3 illustrates a TWI communication chain for the NVRAM storage device interface shown in FIG. 1, in accordance with an embodiment of the present invention.

Available NVDIMM devices support several primary functions. As further illustrated in FIG. 8, each such device 82, 84 typically includes an on-board NVDIMM controller 86, 88 that will receive commands via a two-wire interface (TWI) (e.g., an inter-integrated circuit bus) 90, 92 that is available on a standards-compliant DDR2 memory interface 94, 96. Accordingly, the present PCIe NVRAM FPGA 14 is configured with logic that allows it to issue TWI write and read commands to the NVDIMM controller. This logic allows some commands to be initiated automatically, in the event of a power outage or power-on initialization. The logic also allows a host system (e.g., via software or a driver) 62 to initiate low-level NVDIMM commands via the PCIe interface 22. These commands are executed as PCIe memory write and read operations and will cause the PCIe NVRAM FPGA to generate the appropriate two-wire interface sequence to control the NVDIMM. Examples of NVDIMM-supported commands include "Save DRAM to Flash" as well as "Restore DRAM from Flash". These commands may be conveyed over the TWI communication chain 40, as shown in FIG. 3.

Figure 4:
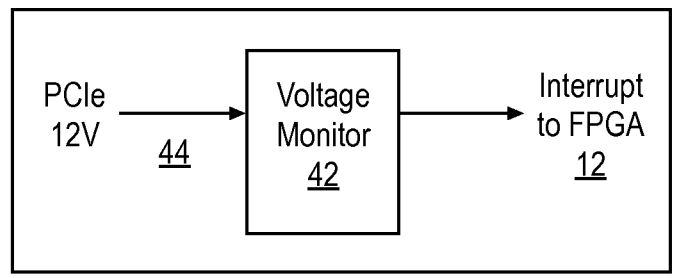
FIG. 4 illustrates details regarding power failure detection logic for the NVRAM storage device interface shown in FIG. 1, in accordance with an embodiment of the present invention.

Further detail regarding the power failure detection logic 12 is shown in FIG. 4. As shown, in one embodiment a voltage monitor 42 (e.g., a comparator) will be used for power failure detection. A default detection threshold level (e.g., 11.00V) is established through the use of a reference voltage. The threshold level can be varied by changing voltage divider resistor values of the voltage monitor. In the event the supply power from the PCIe bus 44 drops below the threshold reference level, an interrupt is provided to the FPGA. In response, the FPGA will initiate the data back-up process.

Figure 5:
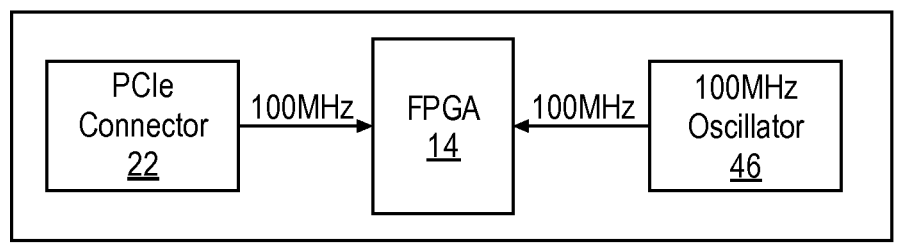
FIG. 5 illustrates a reference clock arrangement for the controller of the NVRAM storage device interface shown in FIG. 1, in accordance with an embodiment of the present invention

As shown in FIG. 5, a 100 MHz reference clock is available from the PCIe bus and may be used for the PCIe interface. An oscillator 46 may be used to provide a 100 MHz differential clock required for the DDR2 interface.

Figure 6:
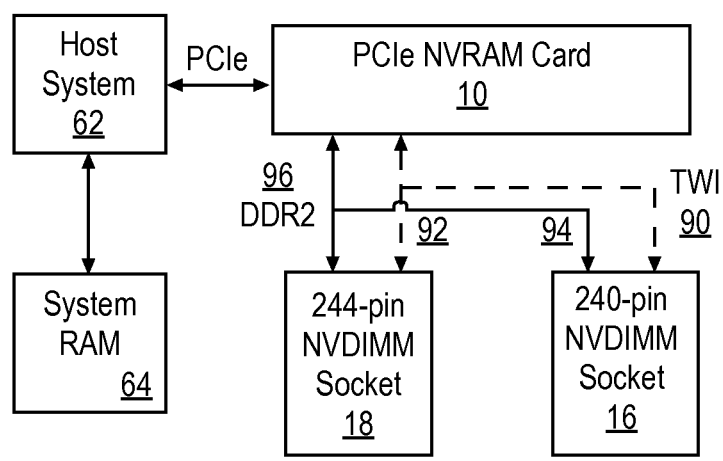
FIG. 6 illustrates a system level representation of the PCIe NVRAM storage device interface shown in FIG. 1 in a typical installation, in accordance with an embodiment of the present invention.

FIG. 6 is a system level representation of the PCIe NVRAM device in a typical installation. A host system 62, which also has access to system RAM 64, communicates with the NVRAM device 10 over a PCIe interface 30. The NVRAM device communicates with an NVDIMM card inserted in one of the NVDIMM sockets 16, 18 over the DDR2 interface 94, 96 (for data exchanges) and the TWI bus 90, 92 (for commands). The data transfer between the host system and NVRAM system is managed by the FPGA of the NVRAM device under the supervision of driver software. The FPGA receives data from the host system memory through the PCIe interface, formats the data as needed for transmission to the NVDIMMs over the DDR2 interface, and transfers it to the specified DDR2 memory locations on the NVDIMM card as specified by the driver. In the event of a power failure, the FPGA initiates a save operation and instructs the NVDIMM card to save the stored data to their on-board flash devices 98, 100. When power is restored, the FPGA issues a restore command, instructing the NVDIMM card to repopulate their DRAM 102, 104 from the on-board flash. The driver software may initiate a save or restore operation at any time, and need not necessarily wait for an indication of a power failure.

Figure 7:
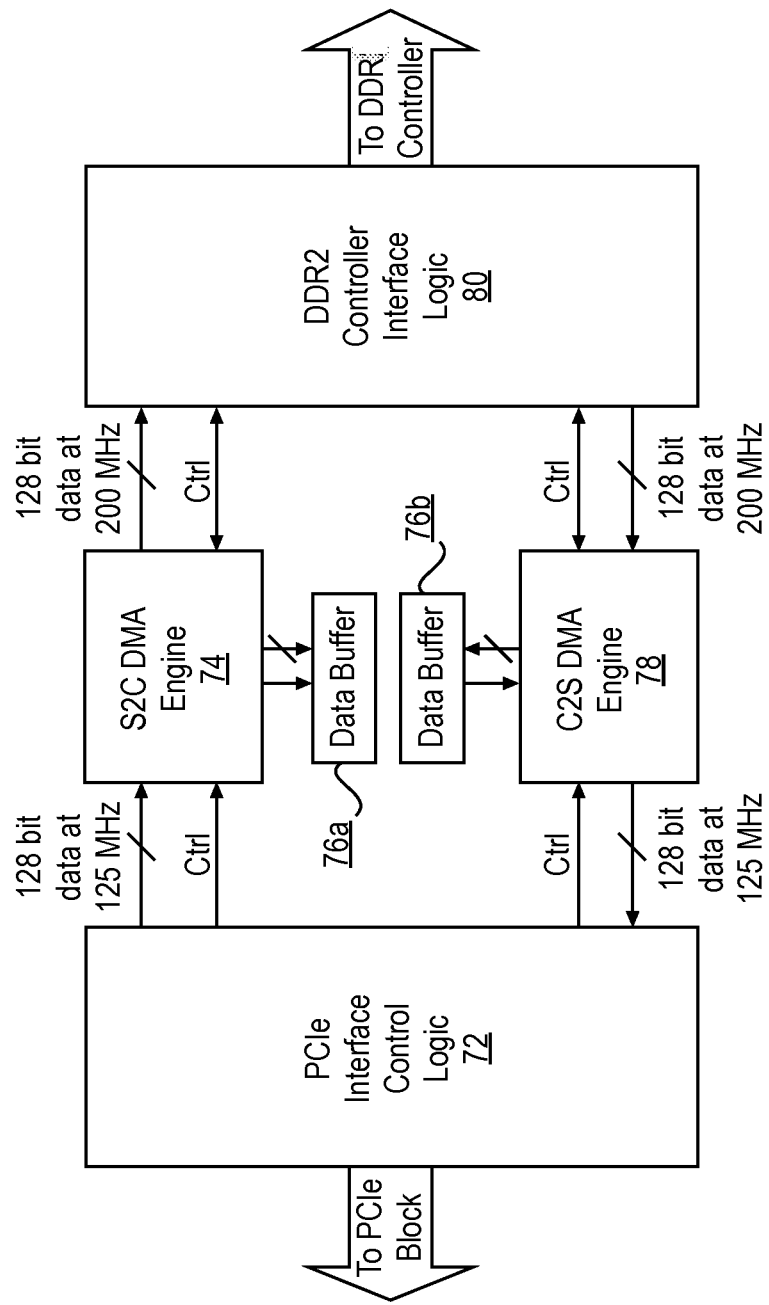
FIG. 7 illustrates one example of PCIe-to-DDR interface logic configured in accordance with an embodiment of the present invention.

FIG. 7 illustrates one example of a PCIe-to-DDR interface logic configured in accordance with an embodiment of the present invention. This interface logic 32, which is shown in FIG. 2 as being instantiated in the FPGA between the PCIe end point 34 and DDR2 controller 36, is responsible for managing the register read and write operations, generating memory read requests to the host system for DMA operations, receiving completion packets for read requests generated, transmitting TLPs to the PCIe block, PCIe address management, SGL management, DMA descriptor management, managing read and write data buffers, managing the DDR2 controller interface for proper memory addressing, burst length etc., and interrupt management. The interface logic includes a PCIe interface control logic 72, which is interfaced to a PCIe end point to handle PCIe transactions.

The interface logic also includes a system-to-card (S2C) DMA engine 74, which manages the data transfer from system memory to the DDR memory of the NVDIMMs (i.e., DMA write operations). The receive port of the DMA engine is interfaced to the receive engine of the PCIe interface with a 128-bit wide interface running at 125 MHz. The transmit port of the DMA engine is connected to the DDR controller through a 128-bit wide interface running at 200 MHz. Data buffers 76a associated with the DMA engine are used for storing the data received from PCIe interface. The data buffers also help in clock synchronization between the PCIe interface and the DDR interface.

Registers of the S2C DMA engine are programmed by a management state machine with the expected number of data words in each data buffer and a starting address of DDR memory where the data in each buffer is supposed to be written. The DMA engine, based on a tag value received along with the data, routes data into the appropriate data buffers. The availability of data is then indicated to the DDR interface logic. An associated memory manager monitors read requests from the DDR controller (on-board the NVDIMM) and informs the management state machine whenever a data buffer becomes free.

A card-to-system (C2S) DMA engine 78 manages data transfers from DDR memory to the host system memory (i.e., DMA read operations). The receive port of the DMA engine is connected to the DDR controller interface logic 80 and the transmit port is connected to a transmit engine of the PCIe logic 72. This block also has associated data buffers 76b for temporarily storing data before transmitting same to the system memory. Under the direction of the management state machine, the C2S DMA engine instructs the DDR controller to initiate read operations, with an associated memory manager providing the following information: a start address in DDR memory, and the number of words to be read. The data returned by the DDR controller is stored in the data buffers and the PCIe transmit engine is informed of the availability of the data.

The DDR2 controller interface logic 80 controls the DDR2 controller 36 shown in FIG. 2. This module receives data from the buffers of S2C memory manager and then transmits it to the DDR2 controller. This module is also responsible for managing DDR2 addressing as well as controlling burst lengths. During DDR read operations, this module receives data from the DDR2 controller, which data is then transferred to the C2S memory manager.

Figure 8:
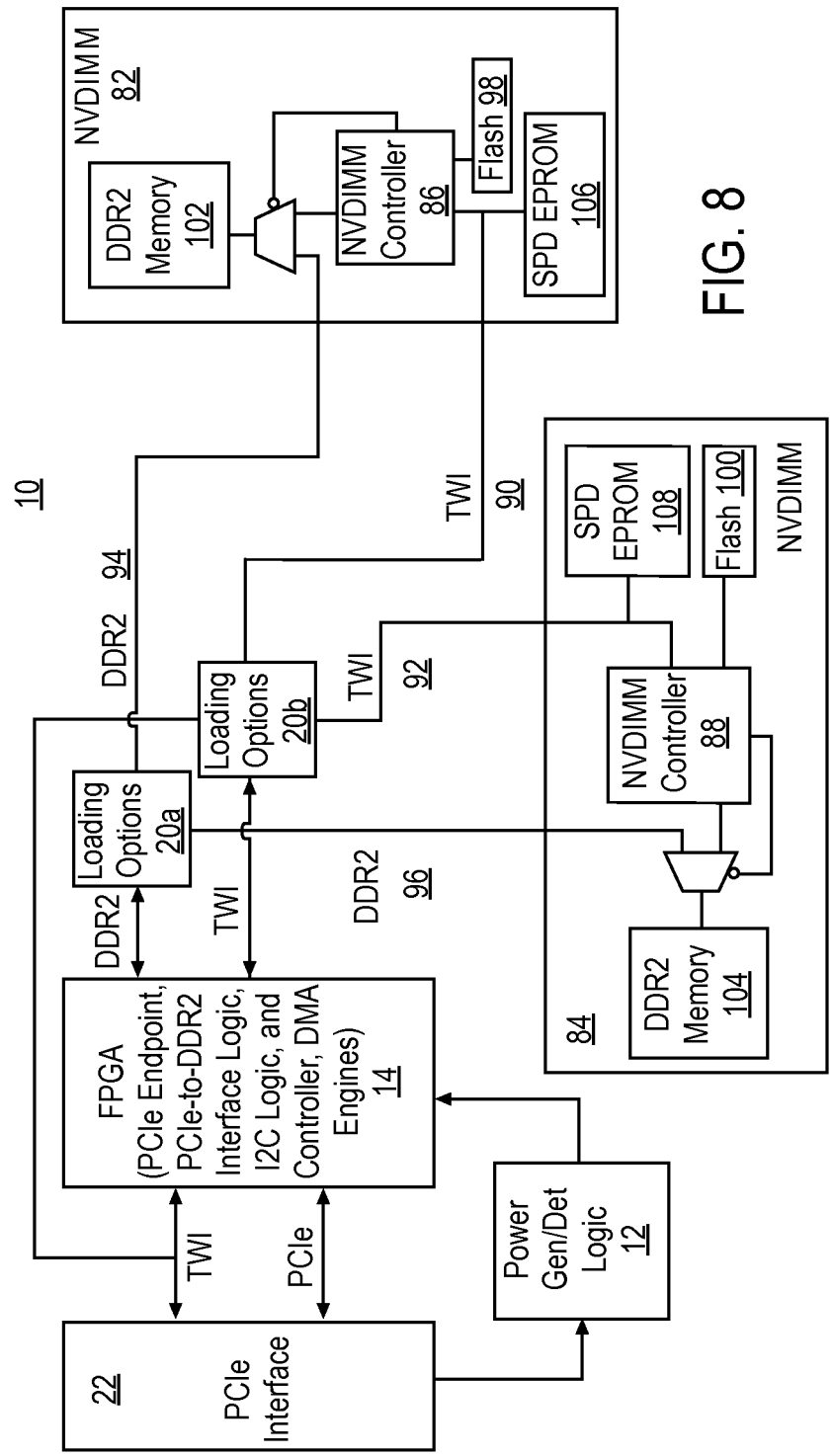
FIG. 8 illustrates a system level representation of the PCIe NVRAM interface shown in FIG. 1 in a typical installation and shows further details of the NVDIMMs, in accordance with an embodiment of the present invention.

FIG. 8 is a system level representation of the PCIe NVRAM device 10 in a typical installation and shows further details of the NVDIMMs 82, 84, including the DDR2 memories, NVDIMM controllers and flash memory backup of those cards. Also included in the NVDIMMs is a serial presence detect (SPD) electrically erasable programmable read only memory (EEPROM) 106, 108, which stores configuration information for the NVDIMM controller. The TWI logic of the FPGA communicates with the NVRAM controllers in order to update the FPGA copies of the NVRAM controller registers as well as to update the NVRAM controller registers based on FPGA register updates.

Figure 9:
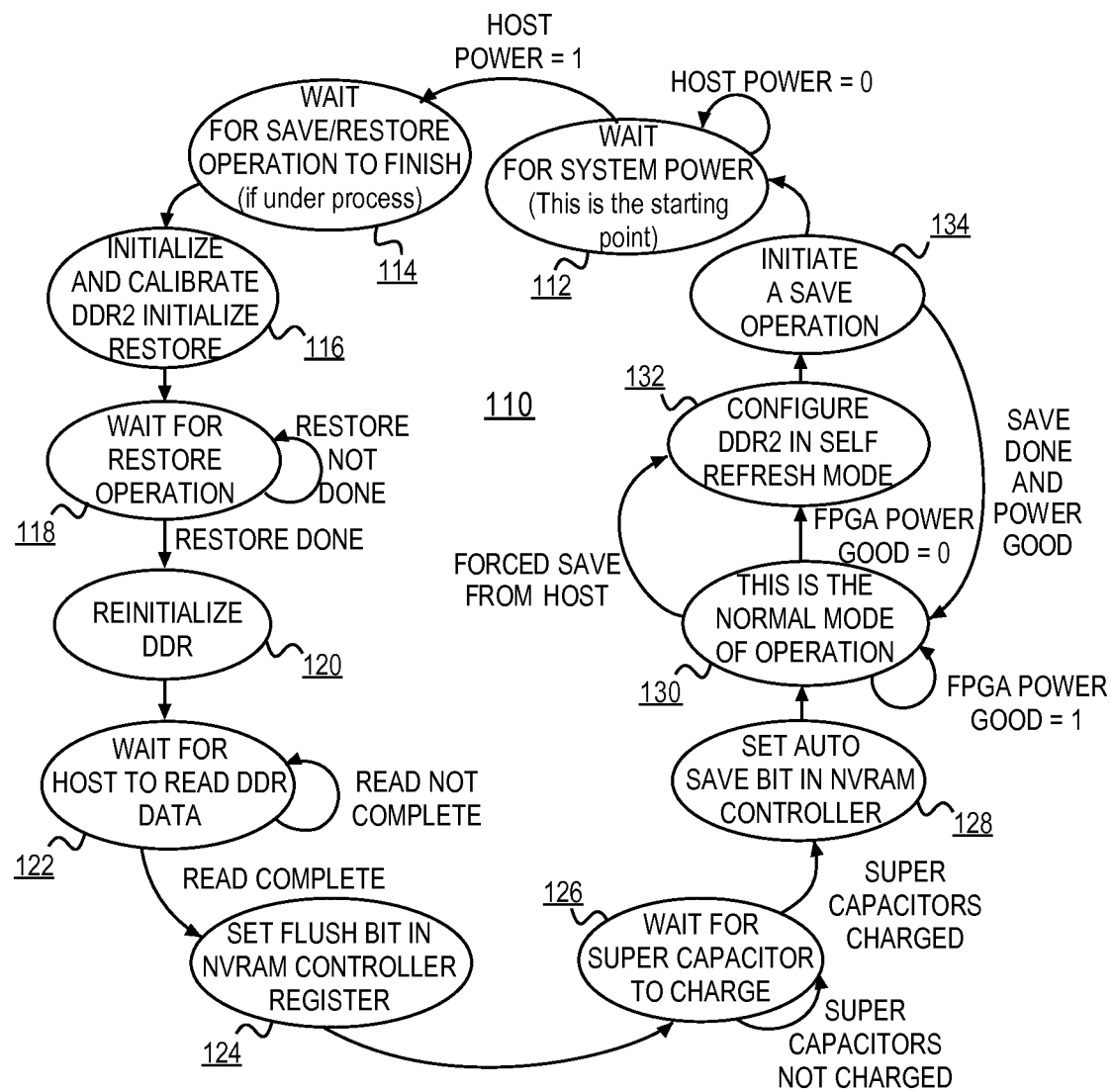
FIG. 9 is an example of an NVRAM management state machine implemented in a controller for the NVRAM storage device interface shown in FIG. 1, in accordance with an embodiment of the present invention.

The operations of the FPGA can be broadly classified into data transfer operations, which are DMA read and DMA write operations, and NVRAM management operations. The NVRAM management operations include controlling and configuring the NVRAM controller registers and safely transferring the control of the DDR memory between the FPGA memory controller and the NVRAM controller. In the following discussion, a save operation refers to transferring data from DRAM to non-volatile flash, and a restore operation refers to transferring data from non-volatile flash to DRAM. The NVRAM management state machine 110 implemented in the FPGA is shown in FIG. 9.

Power up 112: In some instances, when the FPGA powers up it must first check the status of the NVRAM controller. This operation is needed because of the characteristics of some DDR2 controllers which use specified memory locations to store training patterns for DDR controller calibration. Hence, it becomes important that the memory controller is initialized before valid data is stored in the DDR. In order to initialize the memory, it should be determined whether the DDR is currently available for the FPGA controller or is currently used by the NVRAM controller. Consider, for example, a special case, in which a data restore is happening while the FPGA is powered up. If the FGPA does not check for the NVRAM controller status, and blindly tries to initialize the controller, the operation will fail since the memory is under the control of NVRAM controller. Hence, the FPGA makes sure that the NVRAM controller is in idle state and memory is available for FPGA DDR2 controller initialization. This characteristic of DDR controller also makes it impossible to configure the NVRAM controller in auto-restore operation. If auto-restore is enabled, data from flash will be stored in the DDR memory before passing the memory control to the FPGA DDR controller. In this case, when the controller calibrates, it writes to memory locations and, hence, the data gets corrupted. After the initialization, the memory is kept in auto-refresh mode by the FPGA memory controller and the control is passed to the NVRAM DDR controller.

Check the flash status register: The FPGA checks the status of the flash on the NVRAM module to determine whether the data previously stored in the flash is good or bad. If the flash contains valid data, the driver will have to update it in the local memory of the host.

Restore operation 114: The FPGA may initiate a restore operation under driver control, if required by the NVDIMM.

DDR2 calibration 116: After the restore operation 178, if one is used, the DDR memory control will be passed to the FPGA DDR2 memory controller by the NVRAM DDR memory controller. The FPGA brings the DDR memory out of self refresh mode. The controller reconfigures 120 the memory mode registers also. Before passing the memory control to the FPGA, the NVRAM DDR controller will configure it in the self refresh mode in order to preserve the data. The mode register may also be programmed with the values of the NVRAM DDR controller.

Read DRAM data 122: The driver can now read the DRAM data and store it in the host local memory. Reading of DRAM data is optional for both modules. In order to perform a new back up operation, the contents of the flash memory needs to be erased. In that case, the previously saved data will be lost. Since the data stored is critical cache data, the host needs to store it before erasing the flash. This operation may be performed as DMA read operations.

Flash erase: The non-volatile flash may need to be erased before being enabled for new save operations. This operation may be achieved by the driver setting a local control bit 124 in the FPGA and the FPGA writing to an appropriate control register of the NVDIMM controller. The status and completion of the erase process will be updated by the FPGA in the local controller status register for the driver to access.

Wait for capacitors to charge 126: The driver needs to wait for the capacitors of the NVDIMM to reach a threshold value before allowing a new set of DRAM write operations to start. This will ensure there is sufficient power available to perform a back up operation if a power failure occurs. If the DRAM operations are started without waiting for the capacitors to charge, the save operation may fail during a power outage. The capacitor charge status can be monitored by the FPGA reading an appropriate register in the NVDIMM controller. It is expected that the ultra capacitors will charge within the time required for the host operating system to boot.

Enable auto-save 128: The driver should configure an auto-save option in the FPGA local control register. If any unscheduled power failure occurs, setting this option confirms that DRAM data is backed up to the non-volatile flash. Having the auto-save option disabled on power-up and only changing to an enabled status via an application layer call to the driver helps ensure data integrity by waiting until the data was written to a persistent memory location on a hard disk or solid state disk, for example, before allowing the flash to be overwritten. For example, application software may be configured to first copy the data in the flash to the persistent storage location, verify that the copy operation was completed without error, then erase the NVRAM flash via an appropriate driver command and finally enable the auto-save option.

During normal operations 130: The driver can perform force_save and force_restore operations at any time during the normal operation. The completion status of these signals is updated in FPGA status registers. Once these operations are started, DRAM will be available to the driver only after the process is over. In addition, the FPGA will be continuously monitoring the status of the module capacitors that provide power to the NVDIMM card to permit data saves 134 to flash in the event of a power failure. Several different power failure scenarios are analyzed below.

Total power failure: In this case, the system loses power for a considerably long time. Since auto save is enabled, the data will be backed up in the non-volatile flash, and by the time power comes back, the save operation will be over. As explained above, the FPGA checks the controller status and upon finding this condition proceeds accordingly.

Medium power failure: In this case, the system loses power for a short period and when power comes back, the save operation will be progressing. The FPGA recognizes this condition by monitoring the status register as explained above. The FPGA will not abort a save operation because doing so may result in the loss of otherwise unsaved data. Hence, the FPGA will wait for the save operation to complete, then reinitialize the memory.

Short power failure/force save: If the host power fails for a very short period, the save operation will nevertheless be initiated if the auto-save option is enabled. But the power may return even before the FPGA quits. In such instances, the FPGA may abort the save operation and set all required status register bits so that the driver can read the data from DRAM. During a forced save operation, the driver may abort the save operation.

Data transfers from host system memory to the DDR memory and from DDR memory to the host memory data transfer happen as DMA operations. The data to be transferred to the DDR or the system memory where the data from DDR is to be stored may be fragmented. For efficient data transfer operations, a scatter gather list (SGL)-based DMA engine is implemented. The SGL should not be crossing 4 KB boundary in system memory. There are two request registers as well as an SGL first-in-first-out (FIFO) register in the FPGA for storing the information about SGL descriptors. Each descriptor is composed of 4 DWORDs for the system memory start address, DDR memory start address, the transfer length (e.g., in bytes), and control bits for the operation type (read or write) and interrupt enablement.

Through DMA write operations, data from system memory is transmitted to the DDR memory. In order to start a DMA write operation, the FPGA writes the following information into the request registers: an SGL start address in the system memory and the number of descriptors in the SGL array. The SGL management state machine reads this information from the address length FIFO, and issues read requests for SGL list. The received descriptors are stored in the SGL FIFO. Then, each descriptor from the SGL FIFO is fetched and read requests for data are issued. At this takes place, the programmable registers inside the S2C DMA engine are programmed with the expected number of data words (or bytes) for each data buffer. Each data buffer inside the memory manager has fixed tag values. Whenever the completion packets are received, the data is routed to the appropriate data buffer based on its tag value. When there is sufficient data in the data buffers, the DDR2 controller interface logic is notified, fetches the data from data buffer and passes it to the DDR memory controller along with information such as row address, column address and bank address.

DMA read operations are used for transferring data from DDR memory to the system memory. The driver configures the request registers with the following information: SGL start address in the system memory and the number of descriptors in the SGL array. Based on the request register entries, read requests for the SGL are issued. Then, each descriptor is fetched from the SGL FIFO and is decoded for its size and type of operation. The C2S DMA engine is informed of these values by the SGL management state machine and initiates the DDR2 controller interface logic for initiating DDR memory reads through the DDR memory controller. The received data is temporarily stored in the data buffers of C2S DMA engine and when the minimum required data is available, it is transferred by the PCIe transmit engine to the system memory.

In addition to the DMA operations, the entire DDR memory space can be accessed through programmed input/output (PIO) operations as well. To do so, the PCIe is configured to request a defined amount of system memory space. From the point of view of the driver, accessing the DDR memory space using PIO operations will be similar to accessing any FPGA register. The FPGA receive engine will monitor the PCIe register through which the read and write requests are transmitted. If the requests are seen in the designated PIO register, the operation will be considered as a PIO access and data will be written to/read from DDR immediately (for write/read operations). Any data read from the DDR memory will be transmitted as completion packets for the read operations.

Figure 10:
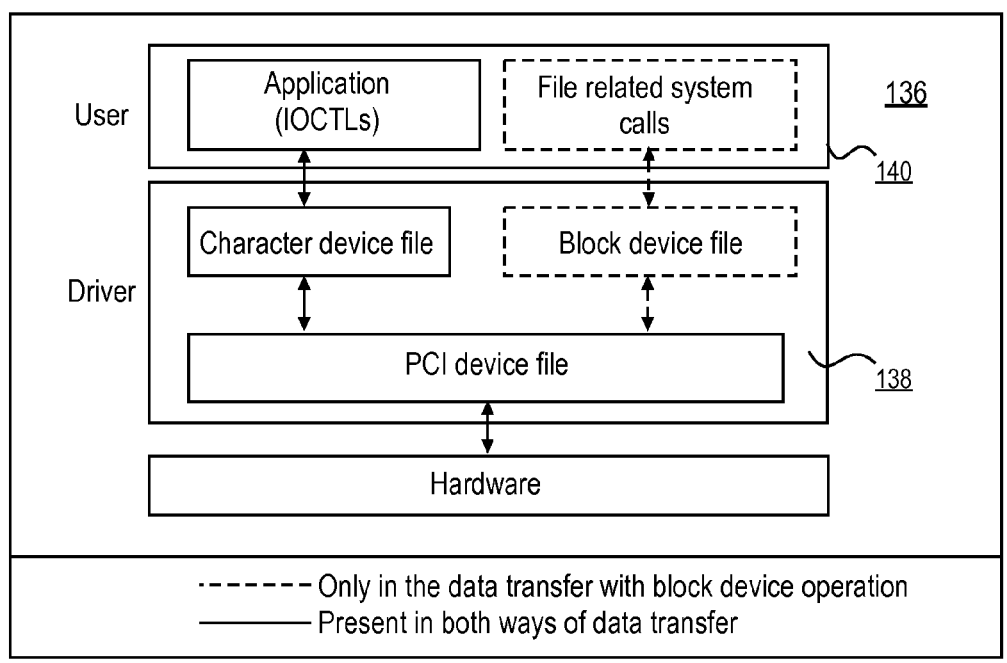
FIG. 10 illustrates a PCIe NVRAM driver architecture according to an embodiment of the present invention.

FIG. 10 illustrates the PCIe NVRAM driver architecture 136 according to an embodiment of the present invention. To add the DDR memory as a disk to the kernel, the driver 138 registers a block device to support file related system calls from the user space 140 and the kernel. To detect the NVRAM device, the driver registers as a PCI device. When the device is detected, the driver will initialize the descriptors for DMA transfers and add the DDR memory as a disk to the kernel. Once the PCI device is detected by the kernel and the corresponding function in the driver, the driver checks for the FPGA status register to know whether the device is ready for block device operations. If the FPGA is not ready for block device operations, the driver will wait for the FPGA to be ready for block operations. During this time, the application can know the status of the device through IOCTL operations.

Data transfers to and from the DDR memory may be performed either by adding the entire DDR memory as a disk to the host's kernel subsystem or by sending data to buffers from the application. The DDR memory can be accessed as a block device by adding it as a block device to the kernel. Data transferred to and from the DDR memory will be available through the bio structures maintained by the kernel subsystem and the bio structures containing the data buffer information are used by the driver to update the descriptors in SGL.

Alternatively, transferring data to the DDR memory may be performed asynchronously through the application. The data buffers transferred to and from the DDR memory will be passed from the application to the driver via input/output control (IOCTL). The driver uses linked lists for queuing the buffers passed by application. The scatter gather input/output (SGIO) structures containing the data buffer information are used by the driver to update the descriptors in the SGL.

Figure 11:
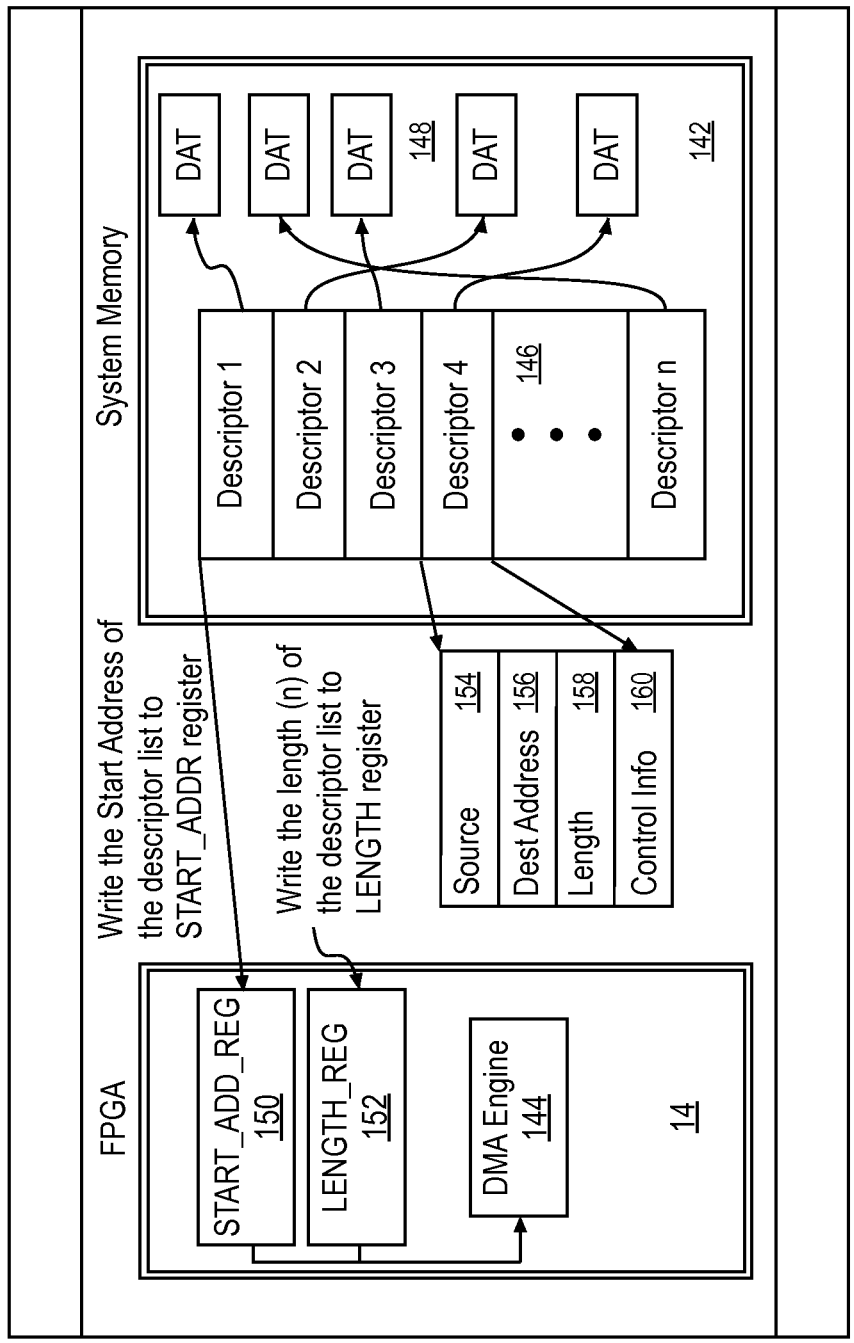
FIG. 11 illustrates an example of DMA transfers used by the NVRAM storage device interface shown in FIG. 1, in accordance with an embodiment of the present invention.

FIG. 11 illustrates the DMA mechanism. Data transfers from the host system memory 142 to the DDR memory and from the DDR memory to the host memory data transfer happens as DMA operations. For efficient data transfer operations, SGL-based DMA engines 144 are implemented. In some instances, the driver may keep multiple SGL lists so that DMA requests may be allocated to more than one SGL. This approach allows improved performance over single SGL-based implementations, because the FPGA 14 will be able to fetch new SGLs from system memory while DMA requests from a prior SGL are in progress. The FPGA processes the SGLs in FIFO order.

Through DMA write operations, data from system memory is transmitted to the DDR memory. The descriptors 146 are formed in the system memory where each descriptor is pointed to the data buffers 148 which are to be transmitted to the DDR memory. These descriptors may be in contiguous memory location and the starting descriptor address may be an aligned address. The address of the first descriptor in this list is written to a START ADDRESS register 150 of the FPGA. The length of the descriptor list (i.e., the number of descriptors in the SGL) is written to a LENGTH register of the FPGA 152. The descriptor structure contains the source address 154 of the data buffer in the system memory to be transmitted to the DDR memory, a destination address 156 of the DDR memory, a length 158 of the data buffer and control information 160 that describes the type of operation. The interrupts are enabled (by setting control bits of the descriptor) for the last descriptor in the SGL so that the FPGA interrupts the host only when all descriptors in an SGL are written to the DDR.

Through DMA read operations, data is transferred from DDR memory to the system memory. The descriptors are formed in the system memory where each descriptor is pointed to the data buffers to which data is transmitted from DDR memory. The driver configures the request registers with any necessary information, such as the start address of DDR memory, start address of the descriptor list, length of the descriptor list and the control information which describes the type of operation. The interrupts are enabled (by setting control bits of the descriptor) for the last descriptor in the SGL so that the FPGA interrupts the host only when all descriptors in an SGL are written to the host memory.

With both reads and writes, message signaled interrupts (MSIs) are used for getting the interrupt after the DMA operation is completed by the FPGA.

Thus, methods and systems for interfacing NVRAM storage devices to host storage systems have been described.

What is claimed is:
1. A memory system controller, comprising:
one or more sockets for accommodating non-volatile dual in-line memory module (NVDIMM) cards;
a peripheral component interconnect express (PCIe) interface for coupling the memory system controller to a host system;
a controller coupled to the PCIe interface over a PCIe-compliant connection and to the one or more sockets over respective double data rate (DDR2) connections, said controller configured to:
 manage data transfers between the host system and a specified one of the NVDIMM sockets in which an NVDIMM card is accommodated as direct memory access (DMA) reads and writes,
 format data received from the PCIe interface for transmission to the specified NVDIMM socket over the corresponding one or more DDR2 connections, and
 initiate save and restore operations on the NVDIMM card accommodated within the specified NVDIMM socket in response to power failure and power restoration indications; and
power detection logic coupled to the PCIe interface and the controller and configured to detect and provide the controller with said power failure and power restoration indications,
wherein the controller is configured as PCIe-to-DDR interface logic between a PCIe end point and a DDR2 controller for managing register read and write operations, generating memory read requests to host system for DMA operations, receiving completion packets for read requests generated, transmitting TLPs to a PCIe block, PCIe address management, scatter gather list (SGL) management, DMA descriptor management, managing read and write data buffers, and managing a DDR2 controller interface.

2. The memory system controller of claim 1, wherein the controller comprises a field programmable gate array (FPGA).

3. The memory system controller of claim 2, wherein the FPGA includes a DMA engine configured to reformat data received over the PCIe bus to comply with DDR2 memory interface requirements for the NVDIMM card.

4. The memory system controller of claim 1, wherein a first one of the NVDIMM sockets is a 240-pin NVDIMM DDR2 RDIMM socket, and a second one of the NVDIMM sockets is a 244-pin DDR2 Mini RDIMM socket.

5. The memory system controller of claim 1, further comprising resistor loads coupled to the controller for configuring the memory system controller according to the NVDIMM card.

6. The memory system controller of claim 1, wherein the controller is configured to issue two-wire interface (TWI) write and read commands to the NVDIMM sockets.

7. The memory system controller of claim 1, wherein the PCIe-to-DDR interface logic includes a system-to-card (S2C) DMA engine, which manages DMA write operations, and a card-to-system (C2S) DMA engine, which manages DMA read operations.

\* \* \* \* \*